United States Patent
Mirhamed et al.

(10) Patent No.: US 12,449,348 B2
(45) Date of Patent: Oct. 21, 2025

(54) METHOD OF OPERATING A POLARIZATION MEASURING DEVICE AND POLARIZATION MEASURING DEVICE

(71) Applicant: Park Systems GmbH, Goettingen (DE)

(72) Inventors: Arash Mirhamed, Dransfeld (DE); Jan-Henrik Quast, Goettingen (DE); Matthias Duwe, Kassel (DE); Daniel Severins, Goettingen (DE)

(73) Assignee: Park Systems GmbH, Goettingen (DE)

( * ) Notice: Subject to any disclaimer, the term of this patent is extended or adjusted under 35 U.S.C. 154(b) by 196 days.

(21) Appl. No.: 18/286,602

(22) PCT Filed: Jan. 25, 2022

(86) PCT No.: PCT/EP2022/051613
§ 371 (c)(1),
(2) Date: Oct. 12, 2023

(87) PCT Pub. No.: WO2022/218579
PCT Pub. Date: Oct. 20, 2022

(65) Prior Publication Data
US 2024/0201071 A1    Jun. 20, 2024

(30) Foreign Application Priority Data
Apr. 13, 2021   (DE) ..................... 10 2021 109 215.9

(51) Int. Cl.
*G01N 21/21*   (2006.01)
*G01N 21/25*   (2006.01)

(52) U.S. Cl.
CPC ........... *G01N 21/21* (2013.01); *G01N 21/255* (2013.01); *G01N 2201/0691* (2013.01)

(58) Field of Classification Search
CPC ................. G01N 21/21; G01N 21/255; G01N 2201/0691; G01N 2021/213
See application file for complete search history.

(56) References Cited

U.S. PATENT DOCUMENTS

| | | |
|---|---|---|
| 4,472,633 A | 9/1984 | Motooka |
| 5,877,859 A | 3/1999 | Aspnes et al. |
| (Continued) | | |

FOREIGN PATENT DOCUMENTS

DE   102005020911   11/2006

OTHER PUBLICATIONS

Woollam John A et al: "Overview of variable-angle spectroscopic ellipsometry (VASE): I. Basic theory and typical applications". Proceedings of SPIE; [Proceedings of SPIE ISSN 0277-786X vol. 10524], SPIE, US, vol. 10294, Jul. 19, 1999 (Jul. 19, 1999), pp. 1029402-1029402 DOI: 10.1117/12.351660 ISBN: 978-1-5106-1533-5. XP060094734.

*Primary Examiner* — Tarifur R Chowdhury
*Assistant Examiner* — Akbar H. Rizvi
(74) *Attorney, Agent, or Firm* — Gerald E. Hespos; Michael J Porco

(57) ABSTRACT

A polarization measuring device is operated by passing light having a predetermined input polarization state to a sample for a potentially polarization changing interaction and from the sample through a polarization selective analyzer and to an intensity detector. The method proceeds by varying an angle between the output polarization state of the light emanating from the sample and the analyzer. The wavelength of the light reaching the intensity detector is varied, and a plurality of intensity measurements are performed successively at different constellations of polarization. Spectral modulation states and corresponding intensity values are stored together with polarization and spectral values representing the corresponding constellation. The polarization modulation and the spectral modulation are performed simultaneously and continuously, and during a single, monotonic variation of the polarization modulation state, the spectral modulation state is varied plural times and during (Continued)

each spectral modulation period ($\tau_\lambda$) plural successive intensity measurements are performed.

14 Claims, 2 Drawing Sheets

(56) References Cited

U.S. PATENT DOCUMENTS

| | | | |
|---|---|---|---|
| 5,920,393 A | 7/1999 | Baker et al. | |
| 8,405,830 B2 | 3/2013 | Cattelan et al. | |
| 2014/0313511 A1* | 10/2014 | Cho | G01N 21/211 |
| | | | 356/364 |

* cited by examiner

METHOD OF OPERATING A POLARIZATION MEASURING DEVICE AND POLARIZATION MEASURING DEVICE

Field of the Invention. The invention relates to a method of operating a polarization measuring device, wherein light having a predetermined input polarization state is passed to a sample for the purpose of a potentially polarization changing interaction therewith and is passed from the sample through a polarization selective analyzer and at least partially to an intensity detector, wherein
  within the framework of a polarization modulation, a relative angle between the output polarization state of the light emanating from the sample and the analyzer is varied, and
  within the framework of a spectral modulation, the wavelength of the light reaching the intensity detector is varied,
and wherein by means of the intensity detector a plurality of intensity measurements are successively performed at different constellations of polarization and spectral modulation states and corresponding intensity values are stored together with polarization and spectral values representing the corresponding constellation.

The invention further relates to a polarization measuring device comprising
  a light source for generating light intended to interact with a sample,
  a sample holder for positioning the sample in the optical path of the light,
  an intensity detector for detecting an intensity of the light after its interaction with the sample,
  a polarization state generator disposed between the light source and the sample and adapted to provide a predetermined input polarization state to the light,
  a polarization-sensitive analyzer disposed between the sample and the intensity detector and adapted to select light components of predetermined polarization states,
  a spectral modulator adapted to vary the wavelength of the light reaching the detector,
  a polarization modulator adapted to vary a relative angle between the output polarization state of the light emanating from the sample and the analyzer, and
  a control unit adapted to drive the intensity detector, the polarization modulator, and the spectral modulator according to a predetermined operating procedure.

PRIOR ART

Polarization measuring devices are generally known as so-called polarimeters or ellipsometers. The same applies to the basic procedures for their operation.

The purpose of such polarization measurements is to determine certain properties of a sample by analyzing the change of the polarization state of a well-defined light beam, the so called measuring beam, caused by an interaction of the sample with said measuring beam. The interaction between the measuring beam and the sample can take place in transmission or reflection. In the case of transmission, one speaks of polarimetry or polarimeters; in the case of reflection, one speaks of ellipsometry or ellipsometers. Both variants shall be addressed here together as polarization measurement or polarization measuring devices.

Since polarization of light is known to be a not directly measurable quantity, the measurement is carried out indirectly by means of an intensity detector preceded by a polarization-sensitive analyzer. This analyzer is characterized by the fact that it only allows predetermined polarization states or light components of such polarization states to pass and suppresses others, depending on its angular position. Depending on the relative position of the polarization state of the light falling on the analyzer to the orientation of the analyzer, the intensity passing the analyzer and reaching the detector changes.

In the context of a polarimetric or ellipsometric measurement, however, the polarization state of the light emanating from the sample and falling on the analyzer is not known precisely; all that is known is the typically explicitly adjustable input polarization state with which the light strikes the sample. The term "polarization state generator" (PSG) usually used in this context is to be understood purely functionally. Corresponding devices can be designed quite differently and, in extreme cases, if a light source itself already provides the desired input polarization state, they can be omitted altogether.

In order to determine the effects of the interaction with the sample on the polarization of the measuring beam, it is necessary to perform several intensity measurements at different relative settings of the analyzer and the polarization state generator. The corresponding variation of the relative setting is referred to here in purely functional terms as "polarization modulation". The corresponding device performing this function is referred to here—also purely functionally—as a "polarization modulator". Depending on the concrete experimental setup, the polarization modulation can be performed e.g. by varying the adjustment of the PSG and/or the adjustment of the analyzer, which then also fulfill the function of the polarization modulator in addition to their actual primary function.

According to different approaches known to the skilled person, mathematical target quantities, such as the ellipsometric parameters Delta and Psi, the so-called Mueller matrix and/or the so-called Jones matrix, can be calculated from intensity measurement data obtained in this way (and the knowledge of the corresponding polarization modulation states). Based on a suitably parameterized model of the sample, conclusions about certain sample properties can then be drawn from these mathematical target quantities using error minimization methods known to those skilled in the art.

It is well known that the effects of the interaction with the sample on the polarization state of the measuring beam can strongly depend on its wavelength. For a comprehensive investigation of the sample, it is therefore common to carry out the procedure outlined above at different wavelengths and to base the evaluation on a correspondingly complex sample model. In this context, the term "wavelength" is used here in customary abbreviation for a spectral band that is selected to be appropriately narrow in the specific individual case. In order to set a desired wavelength, the desired spectral band can, for example, be selected from the broadband spectrum of a light source by means of a monochromator or a variable filter before impingement on the sample and preferably even before a PSG (which may be realized as an apparatus), or behind the sample and preferably also behind the analyzer, but in any case before entry into the detector. Alternatively, a tunable light source can be used. Independent of the concrete technical implementation, such a variation of the wavelength is referred to here purely functionally as "spectral modulation". The corresponding device performing this function is referred to here—also in purely functional terms—as a "spectral modulator".

The polarization measurement according to the invention comprises several intensity measurements at differently set polarization modulation states on the one hand and differently set spectral modulation states on the other hand, i.e. at different constellations of polarization and spectral modulation states.

The intensity detector may be implemented in a variety of ways. For example, essentially point-like photodiodes, one-dimensional line scan cameras or two-dimensional image detectors can be used in the context of the present invention. In particular, the latter are used in imaging ellipsometry, which is particularly beneficial in the context of the present invention, and which could play a major role, for example—if sufficient operating speeds are achieved—in quality control in the semiconductor industry, where layer thickness and/or refractive index of very thin layers or coatings or comparably small structures have to be precisely measured or checked over comparatively large areas. In such an application, there is typically provided also an imaging optics capable of imaging the sample onto the image detector.

A frequently used ellipsometric setup corresponds to the so-called PCSA concept: the measuring beam generated by a light source passes through a PSG consisting of a polarizer designed as a linear polarization filter and a subsequent compensator (typically a lambda quarter plate), is reflected by the sample on which it impinges at an oblique angle of incidence, and then passes through the analyzer, also designed as a linear polarization filter, before falling on the detector. The polarization modulation is usually performed according to the so-called RC principle, in which the compensator is rotated around the optical axis (Rotating Compensator). In the automated processes used in industrial quality control, this is done by motor.

Especially in the industrial environment and particularly in quality control, the process speed plays a significant role. Up to now, it has been common practice to perform a spectrally resolving polarization measurement by first setting a number of different polarization modulation states (as many as required for the determination of the polarimetric or ellipsometric target quantities sought in the specific case) step by step at a chosen wavelength, then recording corresponding intensity measurement values and then repeating the same polarization measurement with the same polarization modulation states at further wavelengths chosen one after the other. This approach is time consuming. Acceleration by a faster step sequence of the polarization modulation, in particular of the compensator rotation, requires stronger and more expensive motors and, due to the stronger accelerations when starting and stopping the compensator, bears the risk of vibrations, which can have a detrimental effect, especially in imaging processes. Therefore, despite their great potential in principle, polarization measurements, especially imaging ellipsometric measurements, have not yet been able to establish themselves widely in industrial quality control.

U.S. Pat. No. 5,920,393 discloses a method and an apparatus for identifying specific components in a sample. Basically, this is a spectral analysis extended by polarimetric aspects, in which a targeted search is made for "patterns" that are specific to components suspected to be present in the sample. The starting point is the knowledge that certain substances have specific optical properties, in particular absorption, reflection and optical activity, i.e. a capacity to change the polarization properties of incident light, which are known with respect to their dependence on the substance concentration in the sample and the wavelength of the incident light. A sample in which such a substance is presumed to be a component is irradiated with light whose properties, in particular wavelength, amplitude and polarization, are individually varied in time; suitably, the properties of a detector for the light emitted by the sample are varied. Irradiation and detection "patterns" are thereby tailored specifically to the substances suspected to be present in the sample, so that their specific influence on the incident light can be detected and the substance in question can be identified as a component of the sample. The publication does not specify special "patterns" of this kind, but only refers to the basically unlimited number of conceivable "patterns" and the necessity of their individual tailoring to the substances assumed to be components in the sample.

OBJECT OF THE INVENTION

It is the object of the present invention to provide a polarization measurement method and a corresponding device by means of which shorter measurement times are made possible without or at least without significant loss of quality.

SUMMARY OF THE INVENTION

This object is achieved in that the polarization modulation and the spectral modulation are performed simultaneously and continuously, wherein during a single, monotonic variation of the polarization modulation state, the spectral modulation state is periodically varied a plurality of times and during each spectral modulation period a plurality of successive intensity measurements are performed.

The object is further achieved in that the control unit is arranged to control the intensity detector, the polarization modulator and the spectral modulator according to the method according to the invention.

The invention is based on the insight that for the determination of the polarimetric or ellipsometric target quantities it is only important that a predetermined minimum number of intensity measurements, depending on the target quantity of interest, is carried out at different polarization modulation states which are distributed as widely as possible over the available interval of non-redundant polarization modulation states. The concrete choice of the polarization modulation states set in the individual case, however, is not important. In the case of a rotatable compensator as polarization modulator, the available state interval corresponds to a rotation of 180°. If, for example, six measurements are to be made within this interval, it is irrelevant for the calculation of the polarimetric or ellipsometric target quantities whether the individual intensity measurements are made, for example, at 30°, 62°, 87°, 122°, 149° and 178°, at 2°, 29°, 58°, 92°, 121° and 151°, or at similar sequences of polarization modulation states. The only decisive factor for determining the target values is that the specified minimum number is reached and the relation of the individual polarization modulation states to each other is known.

This insight is exploited by the inventors in that the target quantities calculated for different wavelengths are determined on the basis of different sets of polarization modulation states. In doing so, the polarization modulator passes only once through the state interval available to it. In the meantime, however, the wavelength of the measuring beam (at least of its portion reaching the detector) changes periodically several times, at least (preferably exactly) as often as corresponds to the minimum number of measuring points for calculating the desired target quantities. Temporally between the individual intensity measurements for a specific wavelength, the intensity measurements for the remaining wavelengths of interest are performed. The target quantities calculated for "red", "yellow", "green" and "blue", for example, are then based on intensity measurements at different sets of polarization modulation states offset from each other. In other words, the time required for the polarization modulator to move from one measurement state setting to the next for a given wavelength is used to make one intensity measurement for each of the other wavelengths of interest. This assumes the scenario, usually given by the apparatus, that the integration time of the intensity detector is very short compared to the time required by the polarization modulator for one run, and also short compared to a period of spectral modulation. Then the smearing or broadening of the spectral state or the polarization state during the intensity measurement caused by the continuous tuning of the spectral modulator and the polarization modulator has practically no effect on the measurement quality. One skilled in the art will know how to adapt this spectral or polarization "blurring" to the requirements of the individual case by appropriate selection of the modulation speeds and the detector integration time or will be able to find it out experimentally without great effort.

The consequence of this approach according to the invention is a significant acceleration of the measurement process as a whole and a reduction of vibrations due to the continuous instead of stepwise movement of the polarization modulator. The latter is of particular benefit to the quality of imaging ellipsometric measurements, which, as mentioned above, is of particular interest in the semiconductor industry, where general measurement acceleration is also of especially great value in quality control.

Preferably, the intensity measurements made during each spectral modulation period immediately follow each other. "Immediately" in this context means at the maximum speed specified by the apparatus. Thus, advantageously, there should be no delay between the individual intensity measurements, for example, because of waiting for a trigger signal. Rather, an intensity measurement should follow the preceding measurement as soon as apparatively possible, i.e. the intensity detector should "run through" so that a maximum number of intensity measurements can be recorded during the given times.

The integration time on which each intensity measurement is based can be controlled as a function of the wavelength set in each case. In this way, dispersion effects can be compensated. For example, it is possible that the output intensity of the spectral modulator is wavelength-dependent. Similarly, the sensitivity of the intensity detector may be wavelength dependent. Even the analyzer may exhibit wavelength-dependent passband attenuation. If such effects are known, a good compensation can be created by means of an appropriate, wavelength-dependent control of the detector integration time. Alternatively, however, it is also possible for the integration time underlying each intensity measurement to be constant, i.e. the same for all measurements.

The variation of the wavelength within each spectral modulation period is preferably monotonic, in particular linear. In the particularly preferred latter case, the spectral modulation results in a sawtooth-shaped wavelength curve. The time sequence of the individual intensity measurements then always leads to the same spectral spacing of the successive intensity measurements.

It has been found to be particularly advantageous if the time span over which the monotonic variation of the polarization state occurs corresponds to an integer multiple of the spectral modulation period. Thus, the "first" wavelength traversed during spectral modulation corresponds to the start setting of the polarization modulator and the end setting of the polarization modulator corresponds to the "last" wavelength traversed during spectral modulation. In between, the wavelength is periodically swept several times, preferably as many times as the minimum number of polarization modulation states required to determine the target quantities.

In an optimal design with respect to the measurement speed, the beginning of each spectral modulation period coincides with the beginning of an integration time of the intensity detector and the end of each spectral modulation period coincides with the end of an intensity detector integration interval, whereby within each spectral modulation period exactly as many intensity measurements are performed as correspond to the number of different wavelengths at which the target quantities are to be determined. In fact, in such a configuration, only the mandatory minimum number of measurements is recorded without any time delay in between. In particular, in cases where only very short integration times are required due to sufficient light intensities, more intensity measurements than mandatory can also be recorded during a spectral modulation period. "Surplus" measurements can be discarded or used elsewhere.

The longer the integration times are in relation to the spectral modulation period, the more essential a synchronization of some kind becomes. In one embodiment of the invention, it is provided that the polarization modulation, the spectral modulation and the intensity measurements are mechatronically synchronized. Preferably, the sequence of intensity measurements thereby provides the basic clock. The spectral modulation is controlled so that its period corresponds to an integer multiple of the integration clock. The polarization modulation is controlled in such a way that the time required for sweeping over the polarization interval corresponds to an integer multiple of the spectral modulation period. Depending on the embodiment, it should be noted that the fundamental clock specified by the integration times can vary depending on the wavelength. With this type of synchronized control of all components, the respective constellation of the spectral modulation states and the polarization modulation states can be determined by simple counting.

In an alternative embodiment, only a coarse drive synchronization is performed, in that the individual components (intensity detector, polarization modulator, spectral modulator) are only roughly preset in the manner outlined above, but then left to run "freely". It may be provided that a polarization adjustment value representative of the respectively set polarization modulation state and/or a spectral adjustment value representative of the respectively set spectral modulation state are measured continuously and converted into the polarization values or spectral values, respectively, that are associated with the intensity values to be stored together with them. In other words, there is no exactly synchronized control of the components; rather, the current setting of the polarization modulator or spectral modulator is measured for each intensity measurement, and from this the polarization/spectral constellation assigned to each intensity measurement is determined and stored.

In the first case mentioned above, a very precise and technically complex control of the components is required. In the second case, on the other hand, a likewise technically complex, very precise measurement of the respective current setting is required. In practice, a mixing system may prove to be optimal in which a good but suboptimally synchronized control is accompanied by a good but likewise suboptimal status measurement of the components and readjusted in each case.

Preferably, it is provided that the polarization modulation is performed by means of a polarization modulator which is arranged in the optical path in front of or behind the sample and is adjustable by a first servomotor. In particular, the polarization modulator can be designed as a pair of a polarizer and a compensator positioned in the optical path between the light source and the sample, the compensator being rotatable by the first servomotor. In any case, such a configuration can be exploited by having the polarization adjustment value be a position value representative of the position of the first servomotor. In other words, it is not necessary to measure the setting of the polarization modulator directly. It is sufficient to measure the respective setting of the servomotor used for its adjustment. Servomotors with a corresponding output at which their current position can be read out are known to the skilled person and are available on the market.

In an analogous manner, it can be provided that the spectral modulation is performed by means of a spectral modulator arranged in the optical path in front of or behind the specimen and adjustable by a second servomotor. This can be exploited in that the spectral adjustment value is a position value representative of the position of the second servomotor. For further explanation, analogous reference is made to what has been said above.

Further details and advantages of the invention will be apparent from the following specific description and drawings.

DESCRIPTION OF PREFERRED EMBODIMENTS

Identical reference signs in the figures indicate identical or analogous elements.

Figure 1:
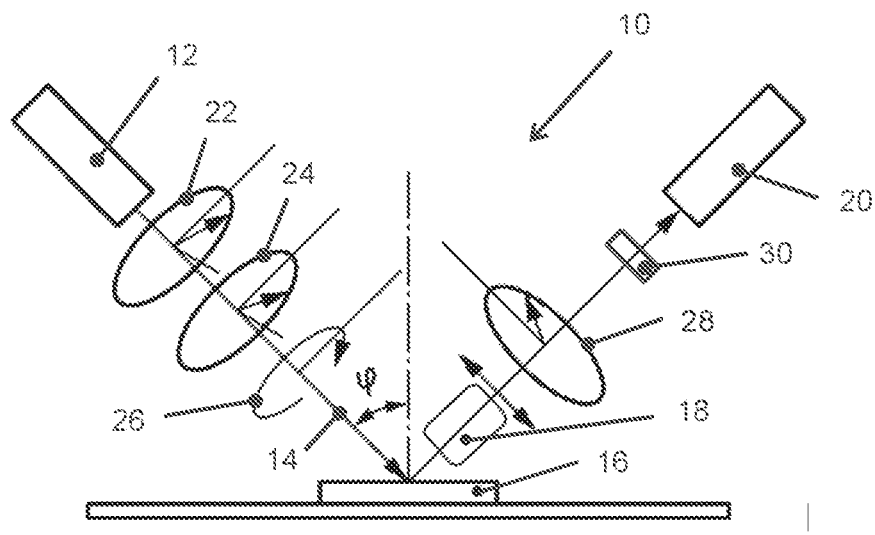
FIG. 1 is a schematic representation of a preferred embodiment of an imaging ellipsometer by means of which the method of the invention can be carried out.

FIG. 1 shows in a highly schematized representation a basically known imaging ellipsometer, which can be operated according to the rotating compensator principle (RC principle). A measuring beam 14 is transmitted from a light source 12 at an angle of incidence q onto a sample 16 and reflected from the latter through imaging optics 18 onto an imaging detector 20. On its way from the light source 12 to the sample 16, the measuring beam 14 passes a (linear) polarizer 22 and a compensator 24 arranged downstream of it, which together act as a polarization state generator (PSG). The polarizer 22 can be designed as a linear polarization filter. The compensator 24 can be designed as a λ-quarter plate by means of which the light components polarized perpendicularly and parallel to the plane of incidence are phase-shifted with respect to each other. This results in a generally elliptical polarization of the measuring beam 14. By rotating the compensator 24 about the optical axis, i.e. the beam direction of the measuring beam 14, the ellipticity and axial orientation (angular position) of the polarization of the measuring beam 14 and thus its polarization state, in particular the input polarization state with which the measuring beam 14 impinges on the sample 16, can be varied. This is indicated by the rotation arrow 26 in FIG. 1.

The part of the sample 16 illuminated by the measuring beam 14 is imaged onto the imaging intensity detector 20 by means of the imaging optics 18. In operation, its light passes through an analyzer 28, which may be designed as a (linear) polarization filter. According to its orientation, the analyzer 28 allows only certain polarization components of the measuring beam 14 to pass, while others are suppressed. Further, in the embodiment shown, the measuring beam passes between the sample 16 and the imaging intensity detector 20 through an adjustable spectral filter 30 which allows only— according to its setting—light components of selected wavelengths to pass and suppresses or deflects other light components to such an extent that they do not fall on the intensity detector 20. Instead of the spectral filter 30 positioned in the detection part of the optical path, this or an equivalent spectral variator, e.g. a monochromator, may be arranged in the illumination part of the optical path. In fact, the preferred embodiment in practice comprises a monochromator positioned between the light source 12 and the PSG 22/24. The illustration of the spectral filter 30 in the detection optical path in FIG. 1 is for clarity only.

In the course of carrying out the method according to the invention, the compensator 24 is continuously rotated from an initial position to an end position. This changes the input polarization state with which the measuring beam 14 falls on the sample 16 accordingly. The output polarization state with which the measuring beam 14 emanates from the sample 16 and interacts with the analyzer 28 also changes accordingly. Thus, the intensity of the light component incident on detector 20 varies with the angular position of compensator 24, and periodically with a period of 180° relative to the angular position of compensator 24. This means that the displacement of the compensator 24 can be limited to a maximum of 180° during a run of the method according to the invention, as is actually the case in the preferred embodiment.

During such a comparatively slow polarity modulation, according to the invention, a likewise continuous modulation of the wavelength of the light component impinging on the detector 20 is carried out several times, for example by corresponding multiple variation of the spectral filter 30 or an equivalent spectral modulator.

Figure 2:
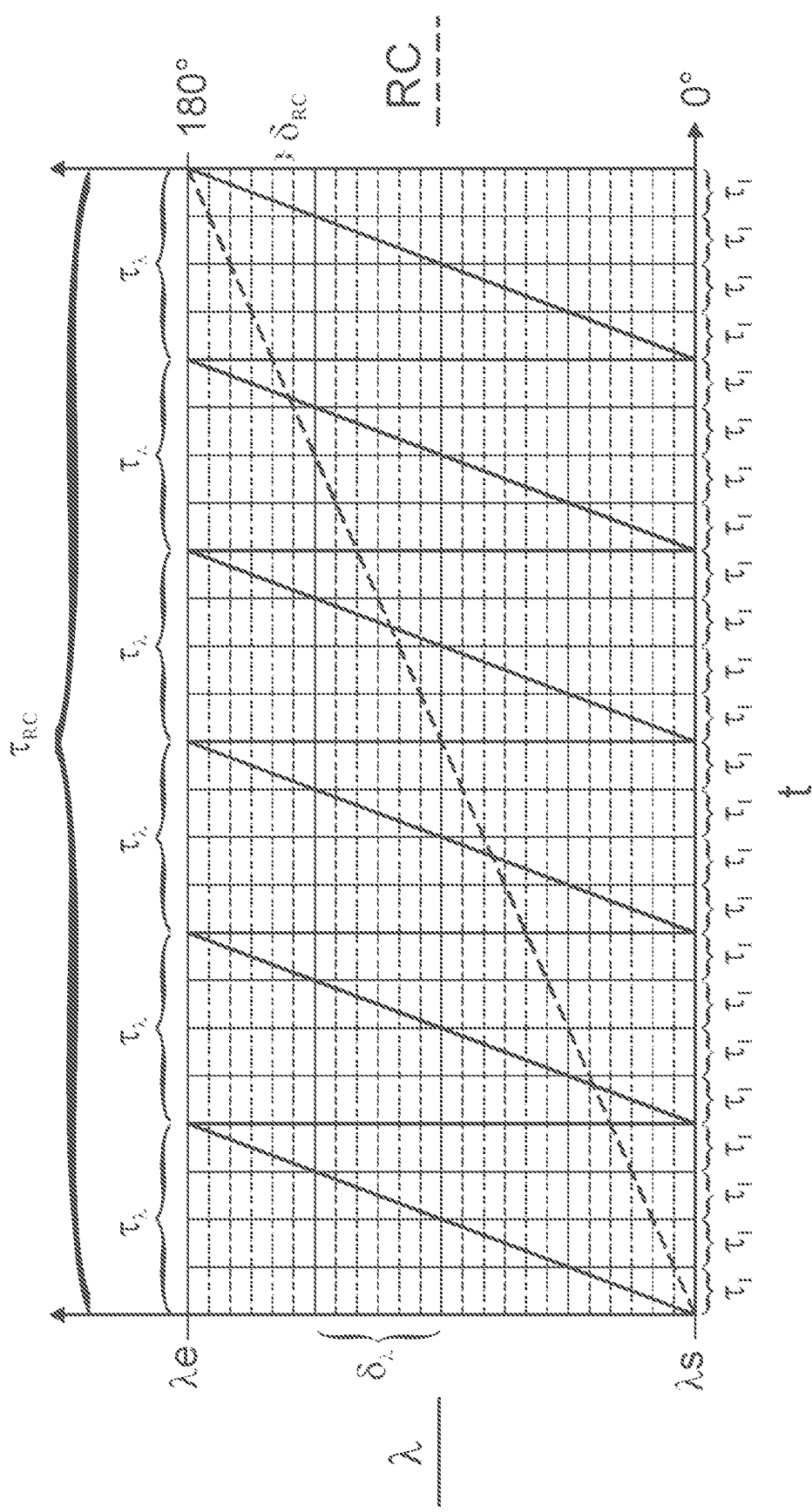
FIG. 2 is a schematic representation of the process flow of the invention.

The time sequence of the process according to the invention is shown schematically and as an example in FIG. 2. With a period of $\tau_{rc}$ the compensator 24 is rotated by 180°. Meanwhile, the wavelength λ is tuned several times, in the embodiment shown six times, between a start wavelength $\lambda_s$ and an end wavelength $\lambda_e$. In the preferred embodiment shown, the tuning is performed in a sawtooth fashion, i.e. during a spectral modulation period $\tau_\lambda$ the wavelength set on the spectral modulator is changed linearly in order to return to the initial state as instantaneously as possible at the end of the period. Corresponding control devices, for example a motor-driven grating of a monochromator, are known to the skilled person. Parallel to this polarization and spectral modulation, a clocked intensity measurement is performed by means of the detector 20. In the embodiment shown, the intensity measurement is performed with constant integration times $\tau_I$.

During an integration interval $\tau_I$, the angular position of the compensator 24 changes by an angular amount $\delta_{RC}$; the wavelength changes by a wavelength amount $\delta_\lambda$. The corresponding intensity measurement can then be assigned a constellation of polarization and spectral state, which can be regarded, for example, as the mean value of the respective polarization or spectral interval $\delta_{RC}$ or $\delta_\lambda$ with corresponding bandwidth ("fuzziness").

Figure 3:
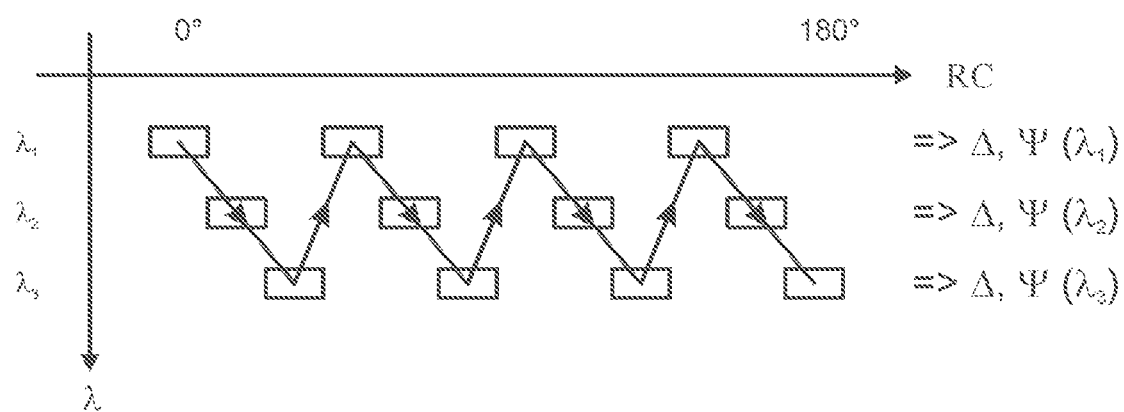
FIG. 3 is a further schematic representation of the process sequence of to the invention.

FIG. 3 shows in a polarization/wavelength plane the positions of the individual intensity measurements, with the solid arrow line representing the time sequence of the intensity measurements. Note that for clarity, the plot of FIG. 3 shows only the intensity measurements at four different polarization intervals and three different spectral intervals (a procedure performed according to the scheme of FIG. 2 would result in intensity measurements at six different polarization intervals and four different spectral intervals).

From the schematic of FIG. 3 it can be seen that due to the method according to the invention both the spectral state and the polarization state change from one intensity measurement to the next intensity measurement, but in the result for three fixed wavelengths in each case four intensity measurements are recorded at different, essentially equally spaced polarization states. Thus, for each wavelength, predetermined polarimetric or ellipsometric target quantities (in the example shown, the ellipsometric parameters $\Delta$ and $\psi$) can be determined with equal accuracy. The required number of measuring points per wavelength depends, as known to the skilled person, on the target quantities of interest and the specific instrumental setup. As can be seen from FIG. 2, however, there are no "dead times" during data acquisition. Rather, the intensity detector runs at its maximum speed specified by the apparatus, so that the measurement is performed with maximum efficiency at the theoretically highest possible speed. At the same time, because the compensator 28 is varied only once, slowly and continuously, no vibrations are introduced that would interfere with the imaging quality of the detector 22. The consequent imaging-ellipsometric measurement results are thus not only obtained faster but also of higher quality and accuracy than has been possible in the prior art.

In the embodiment shown in FIG. 2, the spectral modulation, the polarization modulation and the intensity measurements are synchronized in such a way that a spectral period $\tau_\lambda$ corresponds to an integer multiple of the integration time of the detector 20 $\tau_I$ and the polarization period $\tau_{RC}$ corresponds to an integer multiple of the spectral period $\tau_\lambda$. This synchronization can be achieved by appropriately synchronized control of the individual apparative components. Alternatively, the running speed of the individual components can be preset accordingly and their respective settings monitored and measured so that the positions of the individual intensity measurements in the polarization/wavelength plane (cf. FIG. 3) can be determined subsequently. In practice, a combination of these approaches will probably prevail, in which a rough mechatronic synchronization, i.e. a synchronized control, takes place and is corrected during the process execution by position measurement values recorded in parallel.

Of course, the embodiments discussed in the specific description and shown in the figures are only illustrative examples of embodiments of the present invention. The person skilled in the art is provided with a wide range of possible variations in light of the present disclosure. In particular, the method according to the invention can be used in both polarimetric and ellipsometric contexts. The polarimetric or ellipsometric target quantities selected for determination in each case also do not represent a limitation of the method. The number of intensity measurements to be recorded results in a manner recognizable to the person skilled in the art from the choice of the target quantities sought and the concrete apparative design, in particular the apparative nature of the polarization modulator. With regard to the concrete apparative design of the modulators, the skilled person is of course not limited to the embodiments with motor-driven, mechanical control elements described here as preferred. Electro-optical, magneto-optical, acousto-optical and other devices are already known to him which can be used as functional polarization or spectral modulators. Devices to be invented in the future will also be usable within the scope of the present invention. The same applies to the specific detection technique.

LIST OF REFERENCE SIGNS 10 imaging ellipsometer
12 light source
14 measuring beam
16 sample
18 imaging optics
20 intensity detector
22 polarizer
24 compensator
26 rotation arrow
28 analyzer
30 spectral filter
$\tau_I$ integration time
$\tau_{RC}$ polarization modulation period
$\delta_{RC}$ polarization interval
$\tau_\lambda$ spectral modulation period
$\delta_\lambda$ spectral interval

The invention claimed is:

1. A method of operating a polarization measuring device, comprising:
    passing light having a predetermined input polarization state to a sample for a potentially polarization changing interaction with the sample,
    passing the light from the sample through a polarization selective analyzer and at least partially to an intensity detector;
    within a framework of a polarization modulation, varying a relative angle between an output polarization state of the light emanating from the sample and the analyzer, and
    within a framework of a spectral modulation, varying a wavelength of the light reaching the intensity detector,
    using the intensity detector for successively performing a plurality of intensity measurements at different constellations of polarization and spectral modulation states and storing corresponding intensity values together with polarization and spectral values representing the corresponding constellation, and wherein
    the polarization modulation and the spectral modulation are performed simultaneously and continuously, the spectral modulation state is periodically varied a plurality of times during a single, monotonic variation of the polarization modulation state, and a plurality of successive intensity measurements are performed during each spectral modulation period ($T_\lambda$).

2. The method of claim 1, wherein the intensity measurements performed during each spectral modulation period ($\tau_\lambda$) immediately follow each other.

3. The method of claim 1, wherein the integration time underlying each intensity measurement is controlled as a function of the wavelength chosen in each case.

4. The method of claim 1, wherein the integration time underlying each intensity measurement is constant.

5. The method of claim 1, wherein the variation of the wavelength within each spectral modulation period ($\tau_\lambda$) is monotonic.

6. The method of claim 1, wherein the time period ($\tau_{RC}$) over which the monotonic variation of the polarization modulation state occurs corresponds to an integer multiple of the spectral modulation period ($\tau_\lambda$).

7. The method of claim 1, wherein the polarization modulation, the spectral modulation and the intensity measurements are mechatronically synchronized.

8. The method of claim 1, wherein a polarization adjustment value representative of the respectively set polarization modulation state and/or a spectral adjustment value representative of the respectively set spectral modulation state are measured continuously and converted into the polarization values or spectral values, respectively, that are associated with the intensity values to be stored together with them.

9. The method of claim 8, wherein the polarization modulation is carried out by means of a polarization modulator that is arranged in the optical path in front of or behind the sample and can be adjusted by a first servomotor.

10. The method of claim 9, wherein the polarization modulator is formed as a pair of a polarizer and a compensator positioned in the optical path between the light source and the sample, the compensator being rotatable by the first servomotor.

11. The method of claim 8, wherein the polarization adjustment value is a position value representative of the position of the first servomotor.

12. The method of claim 8, wherein the spectral modulation is carried out by means of a spectral modulator that is arranged in the optical path in front of or behind the sample and is adjustable by a second servomotor.

13. The method of claim 12, wherein the spectral adjustment value is a position value representative of the position of the second servomotor.

14. A polarization measuring device comprising:
a light source for generating light intended to interact with a sample,
a sample holder for positioning the sample in the optical path of the light,
an intensity detector for detecting an intensity of the light after its interaction with the sample,
a polarization state generator disposed between the light source and the sample and adapted to provide a predetermined input polarization state to the light,
a polarization-sensitive analyzer disposed between the sample and the intensity detector and adapted to select light components of predetermined polarization states,
a spectral modulator adapted to vary the wavelength of the light reaching the detector,
a polarization modulator adapted to vary a relative angle between the output polarization state of the light emanating from the sample and the analyzer, and
a control unit adapted to drive the intensity detector, the polarization modulator, and the spectral modulator according to a predetermined operating procedure,
characterized in that the control unit is arranged to control the intensity detector, the polarization modulator and the spectral modulator according to the method of claim 1.

* * * * *